(12) United States Patent
Hodowany

(10) Patent No.: US 10,830,580 B2
(45) Date of Patent: Nov. 10, 2020

(54) METHOD AND A DEVICE FOR ADJUSTING A POSITION OF A DISPLAY SCREEN

(71) Applicant: ADVANCED DIGITAL BROADCAST S.A., Eysins (CH)

(72) Inventor: Wiktor Hodowany, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 0 days.

(21) Appl. No.: 15/961,895

(22) Filed: Apr. 25, 2018

(65) Prior Publication Data
US 2018/0313646 A1 Nov. 1, 2018

(30) Foreign Application Priority Data
Apr. 27, 2017 (EP) .................................... 17168569

(51) Int. Cl.
*G01B 11/27* (2006.01)
*H04N 5/44* (2011.01)
(Continued)

(52) U.S. Cl.
CPC .......... *G01B 11/272* (2013.01); *F16M 11/10* (2013.01); *F16M 11/126* (2013.01); *F16M 11/18* (2013.01); *F16M 11/2014* (2013.01); *F16M 11/2092* (2013.01); *F16M 13/02* (2013.01); *G08C 17/02* (2013.01); *H04N 5/4403* (2013.01);
(Continued)

(58) Field of Classification Search
CPC ............ F16M 11/18; F16M 2200/061; F16M 11/126; F16M 11/2092; F16M 11/38; F16M 13/02; G06F 1/1601; G06F 2200/1612; G06F 3/033; H04N 5/64; H04N 5/23203; H04N 5/655; H04N 5/4403;
(Continued)

(56) References Cited

U.S. PATENT DOCUMENTS 2,890,010 A * 6/1959 Barkheimer ............. A47B 9/04
108/20
4,151,804 A * 5/1979 Wache ..................... A47B 9/00
108/147
(Continued)

FOREIGN PATENT DOCUMENTS

CN 103616899 A 3/2014
EP 1722561 11/2006
(Continued)

*Primary Examiner* — Hiwot E Tefera
*Assistant Examiner* — Taylor L Morris
(74) *Attorney, Agent, or Firm* — Mark M. Friedman

(57) ABSTRACT

A device for adjusting position of a display screen, the device (400) comprising: a front support (480) for holding the display screen (210); motor means (750, 760, 770) for adjusting the inclination of the front support (480); characterized in that it further comprises: a pair of horizontal infrared (IR) sensors (221, 222) configured to be positioned in parallel to a horizontal axis of the display screen (210); a pair of vertical infrared (IR) sensors (231, 232) configured to be positioned in parallel to a vertical axis of the display screen (210); and a controller (710) configured to measure the intensity of a signal received from a remote control unit (240) by the IR sensors (221, 222, 231, 232), and control the motor means (750, 760, 770) depending on the signal intensity measured by the IR sensors (221, 222, 231, 232).

1 Claim, 16 Drawing Sheets

(51) Int. Cl.
*G08C 17/02* (2006.01)
*F16M 13/02* (2006.01)
*F16M 11/20* (2006.01)
*F16M 11/18* (2006.01)
*F16M 11/10* (2006.01)
*F16M 11/12* (2006.01)
*H04N 5/655* (2006.01)
*H04N 21/442* (2011.01)

(52) U.S. Cl.
CPC ....... *H04N 5/655* (2013.01); *F16M 2200/061* (2013.01); *H04N 5/44* (2013.01); *H04N 21/44204* (2013.01); *H04N 21/44218* (2013.01)

(58) Field of Classification Search
CPC ....... H04N 21/42204; H04N 21/44218; H04N 5/44; A47B 2200/04; G01B 11/272
USPC .............................. 248/276.1, 917, 919, 923
See application file for complete search history.

(56) References Cited

U.S. PATENT DOCUMENTS

| | | | | |
|---|---|---|---|---|
| 4,641,804 A * | 2/1987 | Martin | F16M 11/32 | 248/205.1 |
| 4,868,845 A * | 9/1989 | Koropp | A61B 6/4464 | 378/204 |
| 4,919,382 A * | 4/1990 | Forman | B25J 17/0266 | 248/178.1 |
| 4,974,088 A * | 11/1990 | Sasaki | G08B 13/1963 | 348/211.6 |
| 4,980,871 A * | 12/1990 | Sieber | G01S 3/807 | 318/648 |
| 5,191,328 A * | 3/1993 | Nelson | B60D 1/36 | 250/491.1 |
| 5,223,875 A * | 6/1993 | Yanagisawa | G01S 3/786 | 348/169 |
| 5,289,090 A * | 2/1994 | Miller | F16M 11/08 | 248/349.1 |
| 6,095,476 A * | 8/2000 | Mathis | F16M 11/10 | 108/7 |
| 6,348,928 B1 * | 2/2002 | Jeong | G05D 3/10 | 345/649 |
| 6,640,337 B1 * | 10/2003 | Lu | G06F 3/033 | 348/734 |
| 7,023,499 B2 * | 4/2006 | Williams | F16M 11/18 | 348/836 |
| 7,063,295 B2 * | 6/2006 | Kwon | F16M 11/10 | 248/274.1 |
| 7,296,774 B2 * | 11/2007 | Oh | F16M 11/08 | 248/324 |
| 7,377,475 B1 * | 5/2008 | Lopez | F16M 11/18 | 105/29.1 |
| 7,398,950 B2 * | 7/2008 | Hung | F16M 11/10 | 248/276.1 |
| 7,450,835 B2 * | 11/2008 | Lackey | F16M 11/126 | 348/169 |
| 7,535,798 B2 * | 5/2009 | Kong | G01S 5/30 | 367/128 |
| 7,663,478 B2 * | 2/2010 | Oh | F16M 11/08 | 340/384.1 |
| 7,780,131 B2 * | 8/2010 | Oh | F16M 11/10 | 248/276.1 |
| 7,878,470 B2 * | 2/2011 | Oh | F16M 11/10 | 248/278.1 |
| 7,891,620 B2 * | 2/2011 | Grabania | F16M 11/08 | 248/285.1 |
| 7,898,429 B2 * | 3/2011 | Hwang | F16M 11/10 | 340/539.23 |
| 7,984,888 B2 * | 7/2011 | Park | F16M 11/10 | 248/274.1 |
| 8,031,272 B2 * | 10/2011 | Blatchley | H04H 60/33 | 348/836 |
| 8,074,950 B2 * | 12/2011 | Clary | F16M 11/041 | 248/276.1 |
| 8,094,438 B2 * | 1/2012 | Dittmer | F16M 11/10 | 248/125.7 |
| 8,115,877 B2 * | 2/2012 | Blatchley | G06F 1/1601 | 345/158 |
| 8,396,685 B2 * | 3/2013 | Mahajan | G01C 3/08 | 702/150 |
| 8,471,680 B2 * | 6/2013 | Nagasawa | F16M 11/08 | 340/3.7 |
| 8,490,934 B2 * | 7/2013 | Dittmer | F16M 11/10 | 248/291.1 |
| 8,704,904 B2 * | 4/2014 | Boyle | H04N 5/23203 | 348/211.99 |
| 8,724,037 B1 * | 5/2014 | Massey | H04N 5/655 | 348/836 |
| 8,773,352 B1 * | 7/2014 | Huang | G09G 5/00 | 345/156 |
| 8,941,978 B2 * | 1/2015 | Fang | F16M 13/02 | 248/80 |
| 9,266,704 B1 * | 2/2016 | Hall | B66F 3/22 | |
| 2003/0058372 A1 * | 3/2003 | Williams | F16M 11/18 | 348/836 |
| 2005/0110911 A1 * | 5/2005 | Childrey | F16M 11/10 | 348/794 |
| 2006/0125968 A1 * | 6/2006 | Yokozawa | H04N 21/44218 | 348/734 |
| 2006/0171105 A1 * | 8/2006 | Hsiao | G06F 1/1601 | 361/679.06 |
| 2006/0238661 A1 * | 10/2006 | Oh | F16M 11/18 | 348/825 |
| 2006/0256224 A1 * | 11/2006 | Kitaura | H04N 5/4403 | 348/333.01 |
| 2006/0262213 A1 * | 11/2006 | Chung | F16M 11/08 | 348/333.06 |
| 2007/0035671 A1 * | 2/2007 | Ryu | H04N 5/64 | 348/794 |
| 2007/0158515 A1 * | 7/2007 | Dittmer | F16M 11/08 | 248/283.1 |
| 2007/0246618 A1 * | 10/2007 | Choi | F16M 11/18 | 248/125.2 |
| 2007/0258200 A1 * | 11/2007 | Choi | F16M 11/14 | 361/679.06 |
| 2008/0001048 A1 * | 1/2008 | Woo | F16M 11/10 | 248/276.1 |
| 2008/0114560 A1 * | 5/2008 | Jonas | F16M 11/123 | 702/94 |
| 2008/0163709 A1 * | 7/2008 | Choi | F16M 11/08 | 74/89.14 |
| 2008/0232046 A1 * | 9/2008 | Verriere | F16M 11/08 | 361/679.06 |
| 2008/0272256 A1 * | 11/2008 | Oh | F16M 11/08 | 248/281.11 |
| 2009/0084913 A1 * | 4/2009 | Grabania | F16M 11/08 | 248/176.3 |
| 2009/0095867 A1 * | 4/2009 | Oh | F16M 11/10 | 248/371 |
| 2009/0159768 A1 * | 6/2009 | Oh | F16M 11/10 | 248/284.1 |
| 2009/0189032 A1 * | 7/2009 | Su | F16M 11/08 | 248/179.1 |
| 2009/0261985 A1 * | 10/2009 | Nagasawa | F16M 11/08 | 340/12.22 |
| 2010/0013812 A1 * | 1/2010 | Gu | G06F 3/014 | 345/207 |
| 2010/0061041 A1 * | 3/2010 | Chen | F16M 11/105 | 361/679.01 |
| 2010/0061586 A1 * | 3/2010 | Jain | F16M 11/08 | 382/100 |
| 2011/0198467 A1 * | 8/2011 | Parraga Gimeno | F16M 11/121 | 248/284.1 |
| 2011/0238219 A1 | 9/2011 | Wang et al. | | |
| 2012/0033371 A1 * | 2/2012 | Pankros | F16M 11/08 | 361/679.21 |

(56) References Cited

U.S. PATENT DOCUMENTS

| | | | | |
|---|---|---|---|---|
| 2012/0083314 A1* | 4/2012 | Ng | .......................... | H04M 1/11 |
| | | | | 455/557 |
| 2012/0167486 A1* | 7/2012 | Lee | ..................... | A47B 81/062 |
| | | | | 52/125.2 |
| 2012/0293405 A1* | 11/2012 | Iida | ................... | H04N 21/4223 |
| | | | | 345/156 |
| 2013/0002549 A1* | 1/2013 | Chen | .................... | G06F 3/0304 |
| | | | | 345/158 |
| 2013/0093675 A1* | 4/2013 | Lin | ........................ | G06F 3/033 |
| | | | | 345/158 |
| 2013/0140424 A1* | 6/2013 | Frick | ..................... | F16M 11/00 |
| | | | | 248/550 |
| 2014/0361141 A1* | 12/2014 | Coleman | .............. | H05K 5/0217 |
| | | | | 248/550 |
| 2015/0002650 A1* | 1/2015 | Yoshimura | .......... | H04N 5/4403 |
| | | | | 348/78 |
| 2015/0350587 A1* | 12/2015 | Kim | ................ | H04N 21/42222 |
| | | | | 348/734 |
| 2016/0035310 A1* | 2/2016 | Song | .................... | G06F 3/0304 |
| | | | | 345/156 |
| 2016/0127674 A1* | 5/2016 | Kim | ....................... | G09G 5/003 |
| | | | | 348/739 |
| 2016/0239096 A1* | 8/2016 | Okuno | ................... | G06F 3/033 |
| 2016/0356414 A1* | 12/2016 | Noh | ....................... | H04N 5/655 |
| 2017/0127057 A1* | 5/2017 | Sung | ................... | F16M 11/045 |
| 2017/0131789 A1* | 5/2017 | Shim | ...................... | G06F 3/033 |
| 2017/0277323 A1* | 9/2017 | Kim | ...................... | G01N 21/35 |
| 2018/0350281 A1* | 12/2018 | Hur | ........................ | G06T 5/006 |

FOREIGN PATENT DOCUMENTS

| | | |
|---|---|---|
| EP | 2008546 A1 | 12/2008 |
| JP | H01109868 | 4/1989 |

\* cited by examiner $$Intensity \propto \frac{1}{Distance^2}$$

$$\frac{Intensity_1}{Intensity_2} = \frac{Distance_2^2}{Distnace_1^2}$$

$$\sin\beta_1 = \frac{2 \cdot L_1 \cdot L_2 \cdot \sqrt{1-(\frac{L_1^2+L_2^2-D_H^2}{2 \cdot L_1 \cdot L_2})^2}}{D_H \cdot \sqrt{2 \cdot L_1^2 + 2 \cdot L_2^2 - D_H^2}} \quad 341$$

$$X_1 = 90° - \beta_1 \quad 351$$

$$X_1 = \beta_1 - 90° \quad 352$$

Fig. 4D

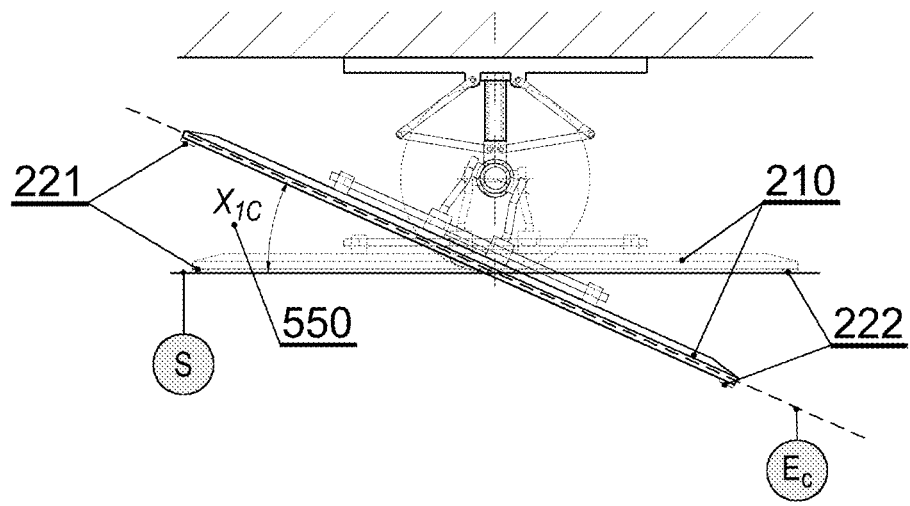

Fig. 5C $$\sin\beta_1 = \frac{2 \cdot L_1 \cdot L_2 \cdot \sqrt{1-\left(\frac{L_1^2+L_2^2-D_H^2}{2 \cdot L_1 \cdot L_2}\right)^2}}{D_H \cdot \sqrt{2 \cdot L_1^2+2 \cdot L_2^2-D_H^2}} \quad 341$$

$$\cos\beta_1 = \sqrt{1-\sin\beta_1^2} \quad 342$$

$$\cos\beta_{1C} = \frac{\cos\beta_1 \cdot \sqrt{2 \cdot L_1^2+2 \cdot L_2^2-D_H^2}}{2 \cdot \sqrt{\frac{2 \cdot L_1^2+2 \cdot L_2^2-D_H^2}{4}+G^2}+\sqrt{2 \cdot L_1^2+2 \cdot L_2^2-D_H^2} \cdot G \cdot \sin\beta_{1C}} \quad 542$$

$$X_{1C} = 90° - \beta_{1C} \quad 551$$

Fig. 5D

METHOD AND A DEVICE FOR ADJUSTING A POSITION OF A DISPLAY SCREEN

TECHNICAL FIELD

The present invention relates to adjusting a position of a display screen.

BACKGROUND

Nowadays, the most common displays are flat panel displays which are used in various appliances, especially in TV sets. They are prone to a poor visibility of the displayed image when viewed at a certain angle—the best viewing position is when the watcher is directly in front of the screen and the line of sight is parallel to the main plane of the screen. Therefore, the flat panel displays are often mounted on screen position adjustment devices, which allow adjusting the position of the screen towards the watcher.

A U.S. Pat. No. 5,992,809 discloses a multi-joined and pivoted support system for supporting a flat panel video display, mounted on a vertical wall surface. The pivotal support system allows for adjustment of the position of the display in vertical and horizontal direction as well as adjustment of its roll, tilt and rotation pivot position. It is equipped with a frictional pivot mounts which restrain the adequate position of the support system. It also comprises a load counterbalance mechanism adjuster which is user-adjustable. The position of the support system must be adjusted manually to overcome the friction imposed by pivot assemblies.

Another U.S. Pat. No. 6,354,550 discloses a video display stand having dual panning axes which is suitable for controlling a screen direction, in horizontal plane, of appliances such as a TV set or a personal computer without bumping against a wall even in a state that it is positioned very closely to the wall. It comprises two motors with gear driving shafts cooperating with movement guide toothed slots, each formed along a circular arc, for adjusting the position of a rotational base. The motors are operated by a dedicated controller.

The existing solutions require manual adjustment of the position of the screen or by means of a dedicated controller that needs to be operated by the user.

Therefore, there is a need to provide a universal screen position adjustment device for automatically adjusting the position of the screen towards the user.

SUMMARY

There is disclosed a device for adjusting position of a display screen, the device comprising: a front support for holding the display screen; motor means for adjusting the inclination of the front support. The device further comprises a pair of horizontal infrared (IR) sensors configured to be positioned in parallel to a horizontal axis of the display screen; a pair of vertical infrared (IR) sensors configured to be positioned in parallel to a vertical axis of the display screen; and a controller configured to measure the intensity of a signal received from a remote control unit by the IR sensors, and control the motor means depending on the signal intensity measured by the IR sensors.

The device may further comprise: a mount for mounting the device to an external structure; a set of foldable supporting arms between the mount and the front support; and a telescopic screw driven by a motor drive and mounted between the supporting arms for adjusting the distance between the mount and the front support.

The device may further comprise: a pivotal mount positioned at the end of the telescopic screw for a rotating mechanism to which the front support is attached; wherein the pivotal mount allows a rotational movement of the front support about a vertical axis while the rotational mechanism allows an inclination movement of the front support set about a horizontal axis by means of motor drives.

The horizontal IR sensors can be configured to be positioned on the left and on the right side of the display screen respectively and the vertical IR sensors can be configured to be positioned on the top and on the bottom side of the display screen respectively.

The extraction of the telescopic screw can be adjusted depending on the calculated swiveling angle.

There is also disclosed a method for adjusting position of a display screen mounted on a motorized support, the method comprising: attaching to the display screen a pair of horizontal infrared (IR) sensors in parallel to a horizontal axis of the display screen; attaching to the display screen a pair of vertical infrared (IR) sensors in parallel to a vertical axis of the display screen; and measuring the intensity of a signal received from a remote control unit by the IR sensors, and controlling motor means of the motorized support depending on the signal intensity measured by the IR sensors.

BRIEF DESCRIPTION OF DRAWINGS

Further details and features of the present invention, its nature and various advantages will become more apparent from the following detailed description of the preferred embodiments shown in a drawing, in which:

FIG. 4D presents formulas for calculating an angle of rotation;

FIGS. 5A-5C present the automatic screen position adjustment device supporting the display screen with schematically indicated final position after rotation;

FIG. 5D presents formulas for calculating an angle of rotation including offset compensation of the axis of rotation of a handle;

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

DETAILED DESCRIPTION

Figure 1:
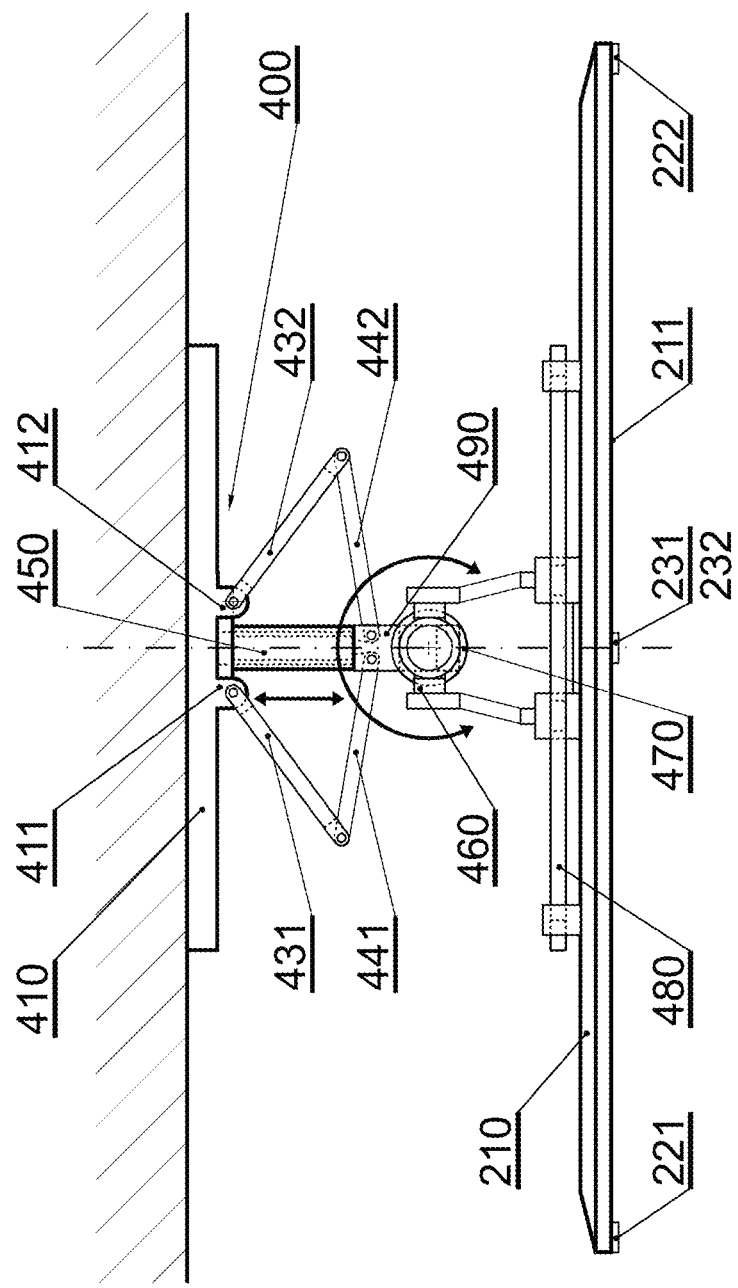
FIGS. 1 and 2 present an automatic screen position adjustment device supporting a display screen, in a top view and side view.

FIG. 1 presents a wall-mounted automatic screen position adjustment device 400 supporting a display screen 210 (such as a TV set) in a top view. The position adjustment device 400 comprises a mount 410 with two fixtures 411, 412 for attaching first parts of foldable supporting arms 431, 432 wherein in between there is a telescopic screw 450, at the end 490 of which second parts 441, 442 of foldable supporting arms are attached. The telescopic screw allows adjusting the distance between a front support 480 and the wall. At the end 490 of the telescopic screw 450 there is a pivotal mount 470 for a rotating mechanism 460 to which the front support 480 is attached. The pivotal mount 470 allows a rotational movement of the display screen about a vertical axis while the rotational mechanism 460 allows an inclination movement of the display screen about a horizontal axis.

Figure 2:
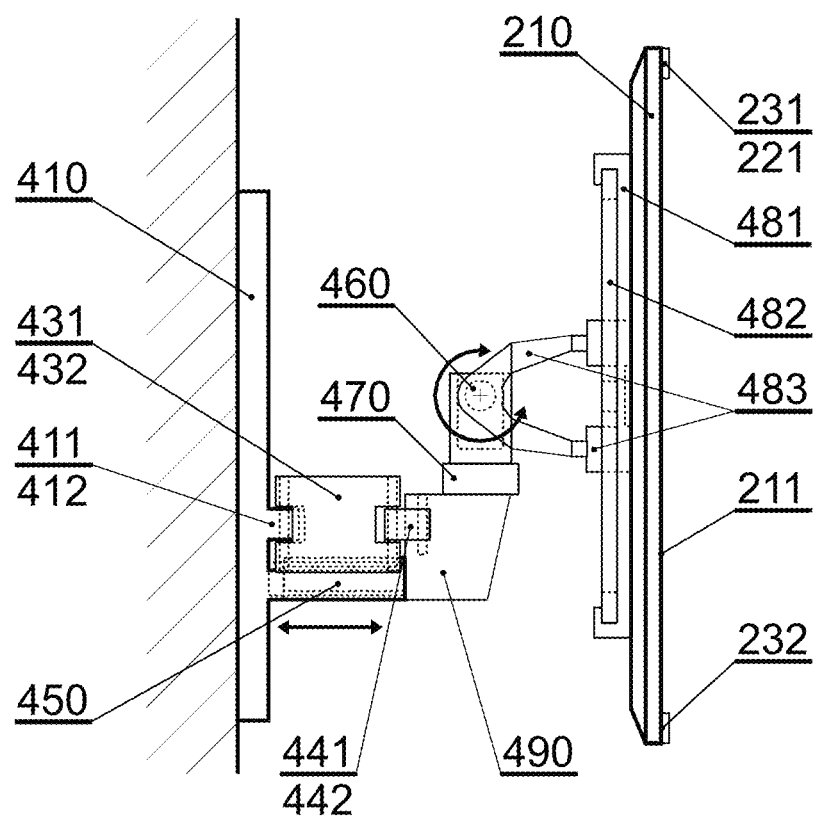

FIG. 2 presents a wall-mounted automatic screen position adjustment device 400 supporting the display screen 210 in a side view, with component elements 481, 482, 483 (such as additional holders and supporting arms, bolts, screws, tighteners) for mounting the display screen 210 are shown. It shall be noted that the front support 480 may have various configurations, depending on the type of the display screen 210 to be held therein. Dedicated front supports 480 may be provided for particular display screens 210, or universal, adjustable front supports 480 may be provided for securing display screens of various sizes.

Figures 3A, 3B:
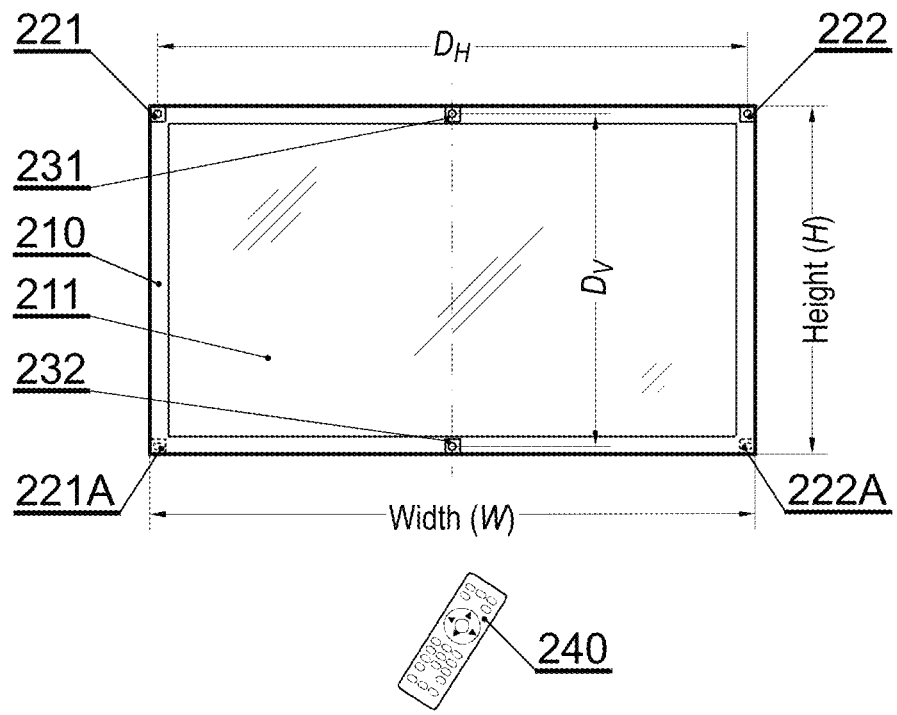
FIG. 3A presents the display screen with a set of IR sensors mounted thereon.
FIG. 3B presents inverse-square law formulas.

FIG. 3A presents the display screen with a set of IR sensors mounted on it. The set of sensors comprises two horizontal sensors 221, 222 or 221A, 222A responsible for determining the position of the screen 211 (the display screen 210) about a vertical axis and two vertical sensors 231, 232 responsible for determining the position of the display screen about the horizontal axis. The horizontal sensors are positioned in parallel to a horizontal axis of the screen, for example on the left and right side of the edge of the display screen 210 and a distance between them is denoted as $D_H$. The vertical sensors are positioned in parallel to a vertical axis of the screen, for example on the top and bottom side of the edge of the display screen (preferably on the vertical axis of symmetry of the display screen) and a distance between them is denoted as $D_V$. A width of the display screen is denoted as W and a height of the display screen is denoted as H. These parameters ($D_H$, $D_V$, W, H) are introduced into a positioning system of the screen position adjustment device 400 upon installation and first start. The adjustment of the screen position is conducted basing on the received IR signal intensity from a remote control unit 240. Depending on the position of the remote control unit with respect to the display screen, the intensity of the signal received by each IR sensor, varies. The relation of the received intensity of the IR signal and the distance of its source may be described by the inverse-square law presented in FIG. 3B, which states that the intensity is inversely proportional to the square of the distance from the source of that signal. On the basis of differences in signal intensities received by each IR sensor it is possible to automatically adjust the screen position so that it is directed towards the received IR signal.

Figure 4A:
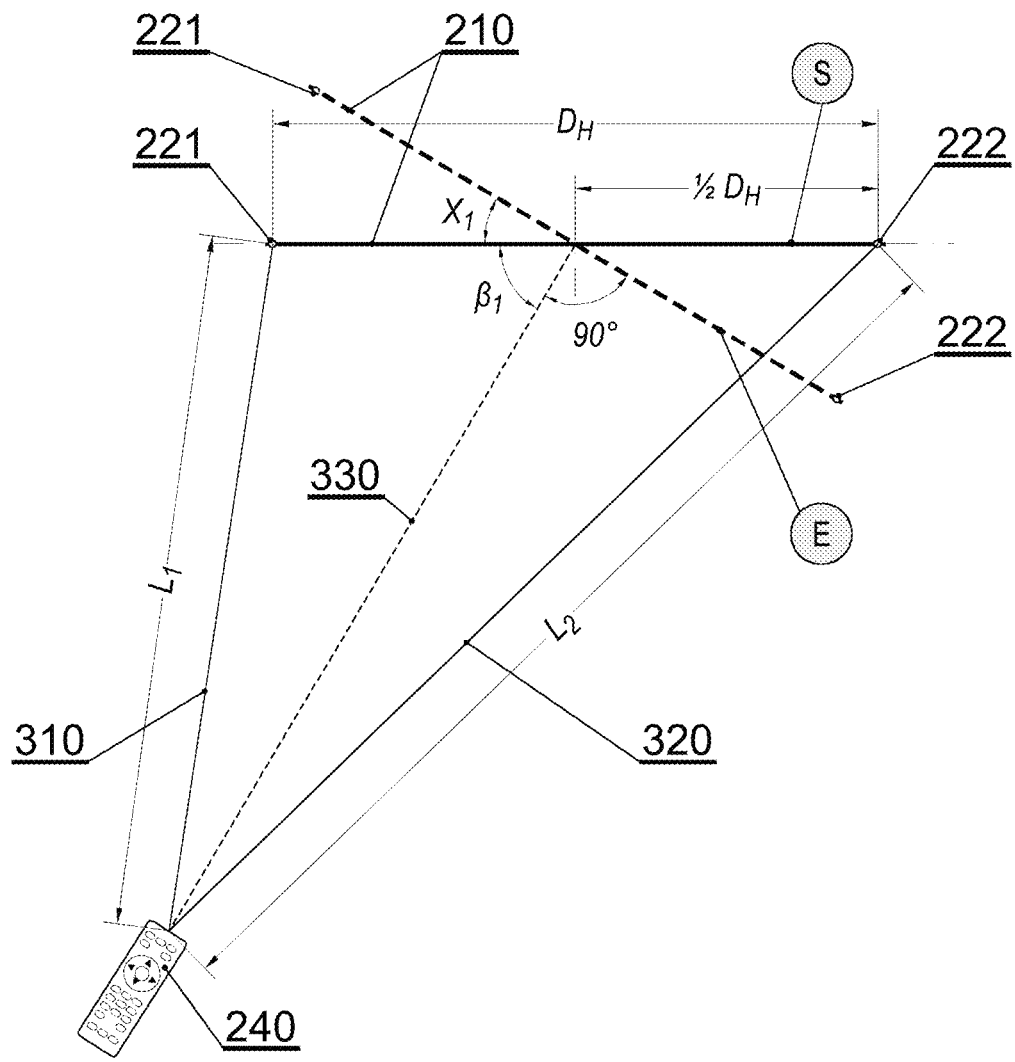
FIGS. 4A, 4B present schematically, in a top view, a principle of a display screen position adjustment.
Figure 4B:
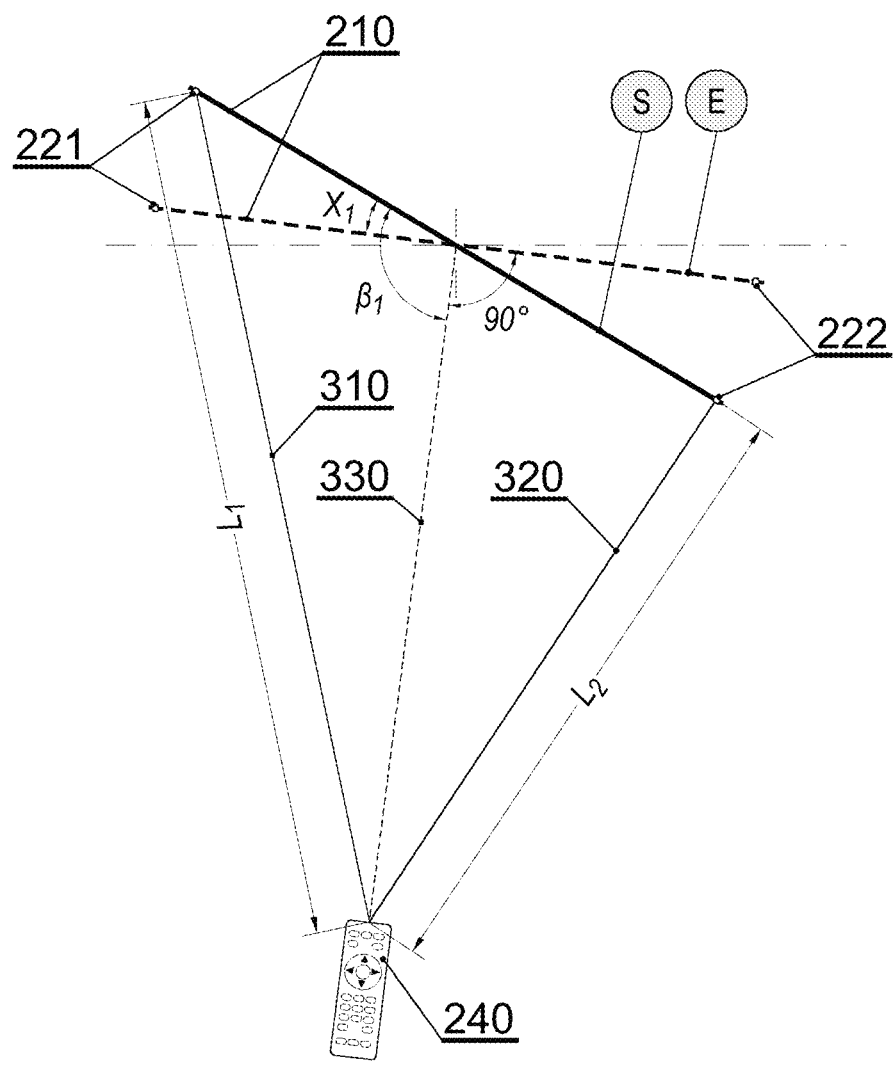

FIGS. 4A, 4B present schematically, in a top view, a principle of the display screen position adjustment. Initially the display screen is at an angle 1, different than 90 degrees, with respect to the line 330 (corresponding to line of sight of the watcher), being a central line between lines 310, 320, passing through the IR transmitter of the remote controller 240 and the display screen vertical axis of rotation being at the distance ½ $D_H$ from its edge. The initial position of the display screen is denoted as S. A distance between the remote control unit 240 and the horizontal left 221 and right 222 sensors is equal to $L_1$ and $L_2$ respectively. According to formulas presented in FIG. 4D it is possible to determine the angle $X_1$ by which the display screen should be rotated in order to be perpendicular to the user as indicated by letter E, being its final position. If $L_1>L_2$ the formula 352 is used, if $L_1<L_2$ the formula 351 is used.

Figure 4C:
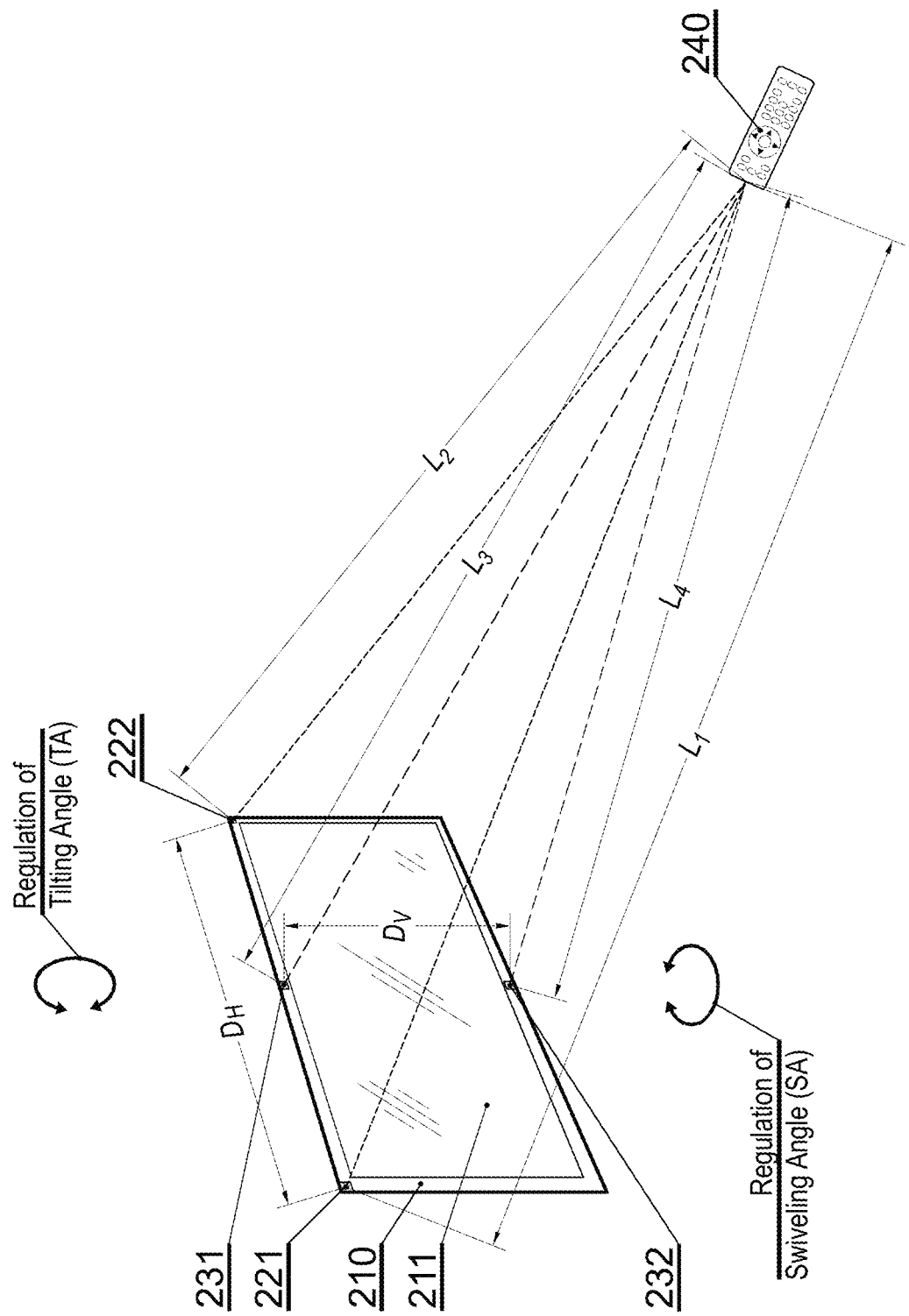
FIG. 4C presents schematically distances between the remote controller and IR sensors.

FIG. 4C presents schematically the distances between the remote controller and IR sensors. A distance between the remote control unit 240 and the upper vertical sensor 231 is equal to $L_3$ and a distance between the remote control unit and the lower vertical sensor 232 is equal to $L_4$. The vertical sensors 231, 232 are responsible for determining the position of the display screen about the horizontal axis $T_A$. The horizontal sensors 221, 222 are responsible for determining the position of the display screen about the vertical axis $S_A$.

When calculating the angular position of the display screen about the horizontal axis $T_A$ it is necessary to use the values $L_3$ and $L_4$ instead of values $L_1$ and $L_2$ respectively, and $D_V$ instead of $D_H$, in the formula 341.

Figure 5A:
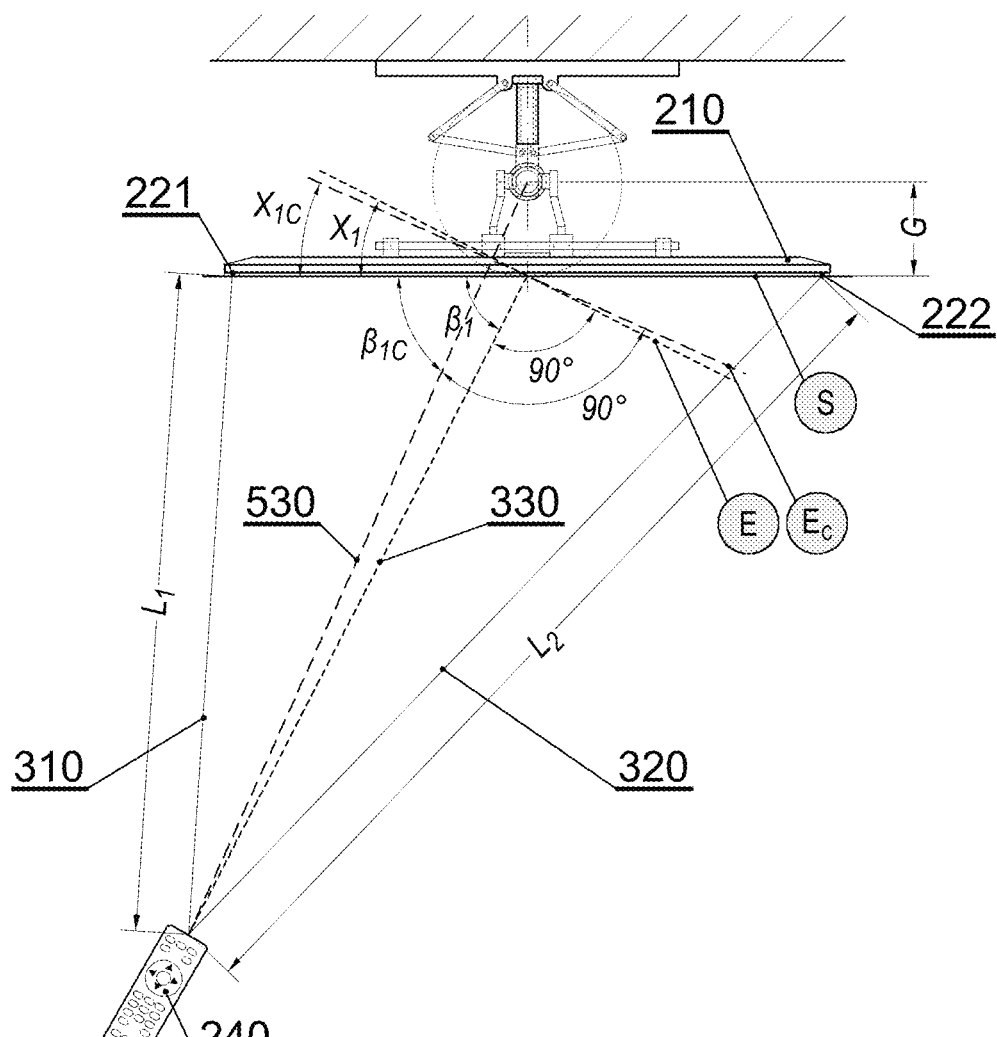
Figure 5B:
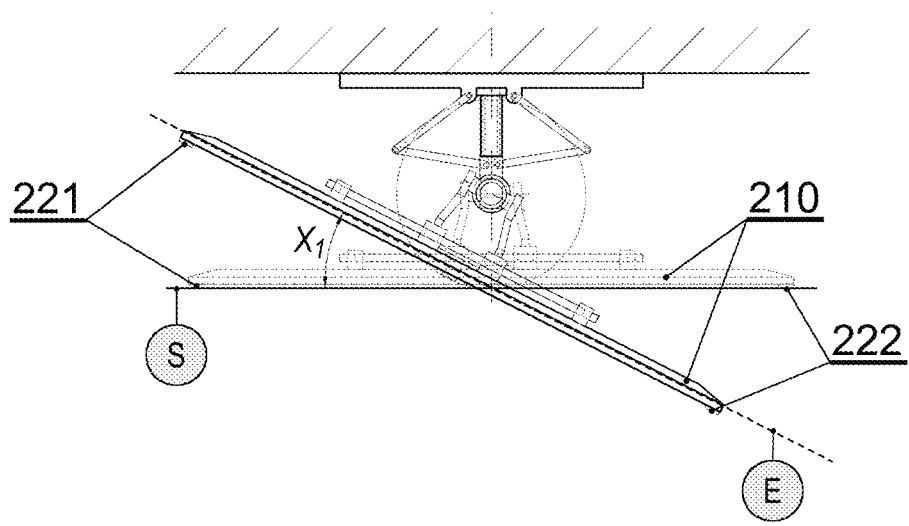

FIGS. 5A-5C present a wall-mounted automatic screen position adjustment device supporting the display screen with schematically indicated final position $E_C$, after rotation. As previously stated the calculated angle $X_1$ is the angle by which the display screen should be rotated. However it is also necessary to take into account the distance G between the axis of rotation of the adjustment device and the axis of the display screen mounted on it. As a result the real angle of rotation is equal to $X_{1C}$ which corresponds to the final position $E_C$ of the display screen. The real angle of rotation $X_{1C}$ may be calculated according to formulas 341, 342, 542, 551 presented in FIG. 5D, wherein the coefficient $\beta_{1C}$ corresponds to the angle between the line parallel to the initial position of the display screen and the line 530 passing through the point of rotation of the position adjustment device and the IR transmitter of the remote control unit 240.

Figure 6A:
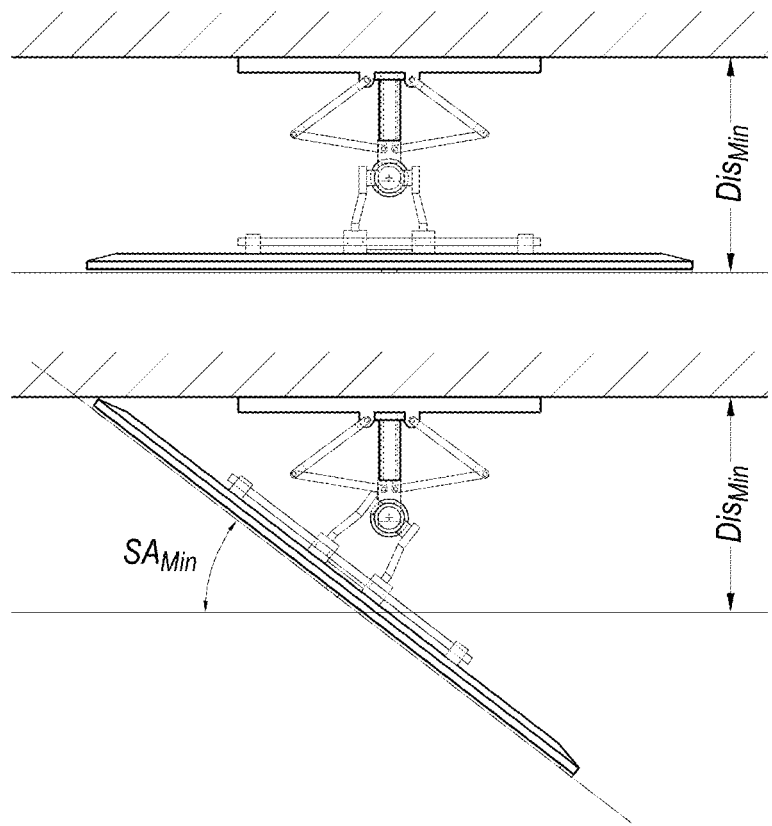
FIG. 6A presents the automatic screen position adjustment device in a retracted position.

FIG. 6A presents the automatic screen position adjustment device in a retracted position where the distance between the display screen and the wall is minimal and equal to $Dis_{Min}$. While in the retracted position the possible angle of rotation of the display screen about the vertical axis is equal to $SA_{Min}$ (SA—Swiveling angle).

Figure 6B:
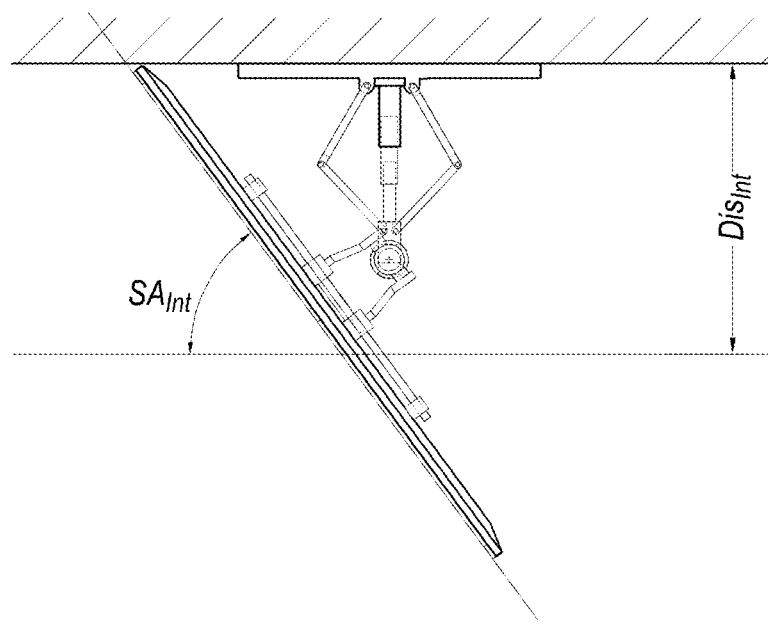
FIGS. 6B-6C present the automatic screen position adjustment device in a semi extracted and fully extracted position.
Figure 6C:
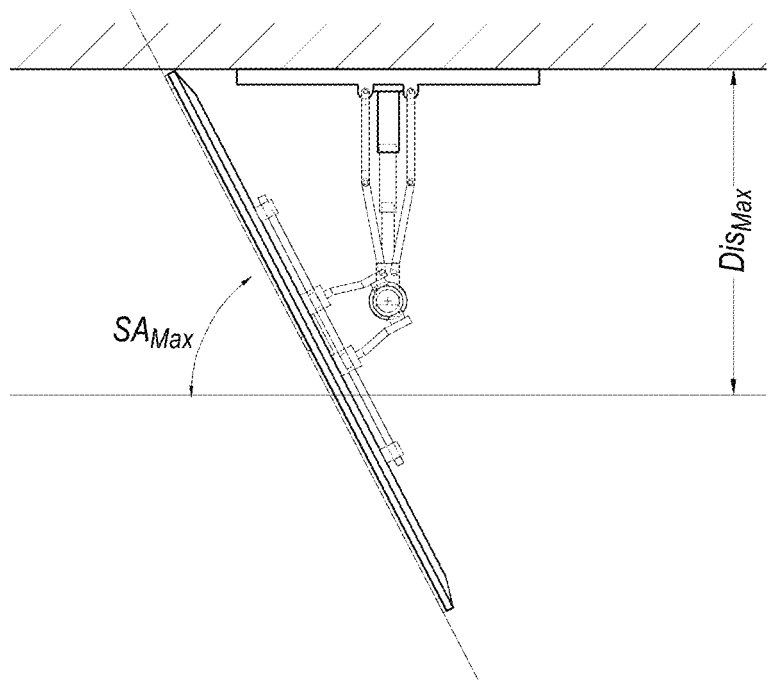

FIGS. 6B-6C present the automatic screen position adjustment device in a semi extracted and fully extracted position. In order to rotate the display screen about the vertical axis by angles $SA_{int}$, $SA_{Max}$ (being the maximal angle of rotation), greater than the minimal angle $SA_{Min}$ it is necessary that the telescopic screw 450 is in the semi extracted position wherein the distance of the display screen from the wall is equal to $Dis_{Int}$, or in fully extracted position wherein the distance of the display screen from the wall is equal to $Dis_{Max}$.

Figure 6D:
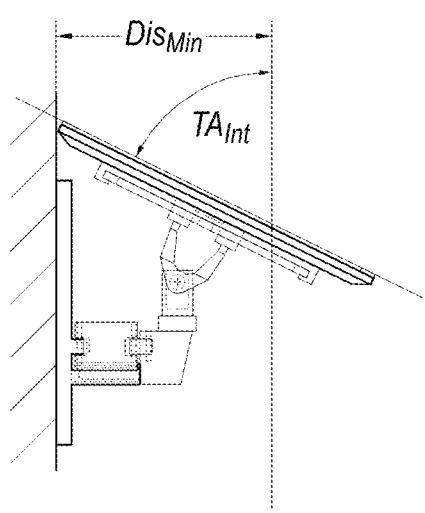
FIGS. 6D-6E present different positions of the display screen when rotated about the horizontal axis.
Figure 6E:
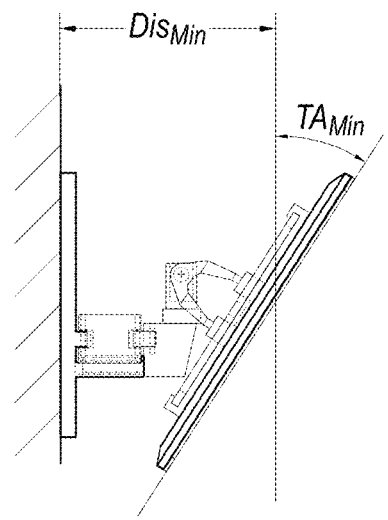

FIGS. 6D-6E present different positions of the display screen when rotated about the horizontal axis. The distance $Dis_{Min}$ of the display screen from the wall determines the possible angle of rotation $TA_{Int}$ (TA–Tilting angle) of the display screen towards the top. The angle $TA_{Int}$ may be increased with the extraction of the telescopic screw 450. An angle of rotation $TA_{Min}$ of the display screen towards the bottom is limited by the construction of the device 400 and cannot be increased.

Figure 7:
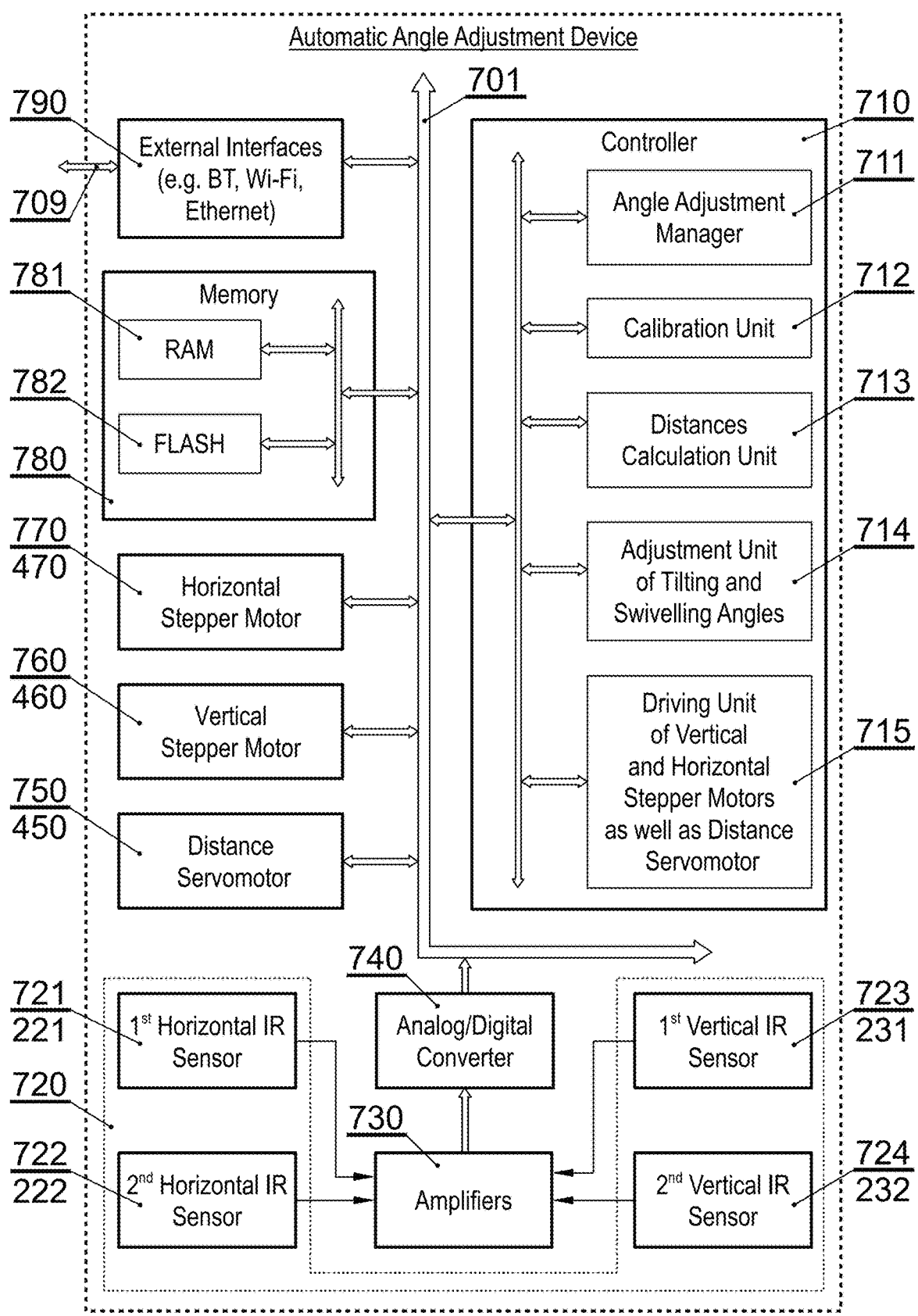
FIG. 7 presents a block diagram of the automatic screen position adjustment device.

FIG. 7 presents a block diagram of the automatic screen position adjustment device. A data receiving/transmitting block 790 is configured to communicate, via at least one transmission channel 709, with external interfaces (for example BT, Wi-Fi or Ethernet). Data received by the block 790 may be related to parameters, dimensions of the display screen. A memory block 780 comprising a RAM 781 and FLASH 782 memory modules store inter alia the parameters related to parameters and dimensions of the display screen and sensors alignment, reverse light current vs. irradiance, relative radiant sensitivity vs. angular displacement and/or other parameters, depending on the technical specification of a particular IR transmitter or receiver. A controller 710 comprises a plurality of units configured to provide the functionality of the device as described herein, including at least one of:

- an angle adjustment manager 711 responsible for determining the final angular position of the display screen basing on the signals received from the IR sensors unit 720 comprising a first horizontal sensor 721, a second horizontal sensor 722, a first vertical sensor 723, and a second vertical sensor 724, wherein the sensors are connected to amplifiers 730 for amplifying their signals which are converted in the analog/digital converter 740,
- a calibration unit 712 for calibrating the IR sensors upon installation and first start,
- a distances calculation unit for determining the actual distances of the device with respect to the wall,
- an adjustment unit 714 responsible for controlling tilting and swiveling angles,
- and a driving unit 715 for controlling a vertical stepper motor 760, horizontal stepper motor 770 and a distance servomotor 750.

The modules of the device 400 communicate with each other over a bidirectional data bus 701.

Figure 8:
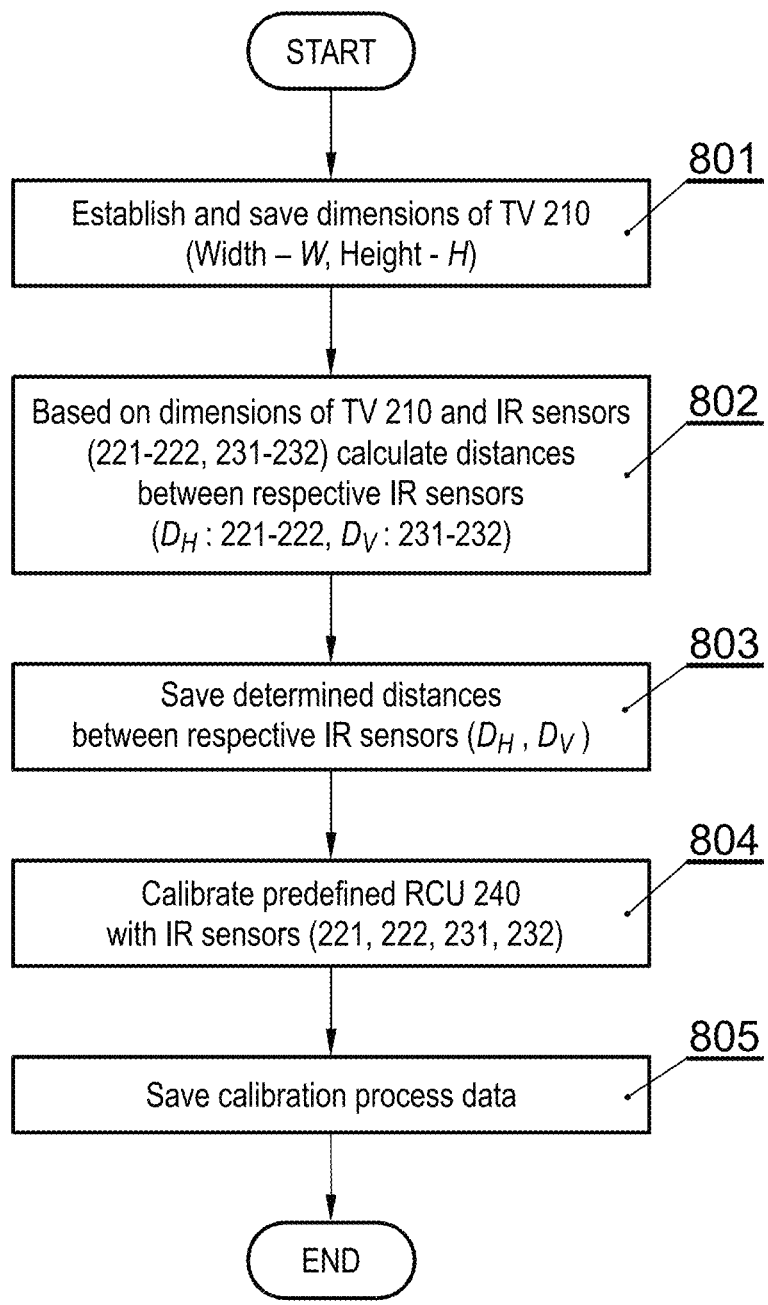
FIG. 8 presents a calibration procedure.

FIG. 8 presents a calibration procedure. In the first step 801 dimensions of the display screen 210 (its height H and width W) are introduced and saved. In step 802 basing on dimensions of the display screen 210, position of the IR sensors on the display screen 210 and/or type of the IR sensors 221, 222, 231, 232 the distances $D_H$ and $D_V$ between the respective sensors are calculated. In step 803 the calculated distances $D_H$, $D_V$ are saved to the memory. In step 804 the remote control unit 240 is calibrated with the IR sensors 221, 222, 231, 232. In step 805 the calibration process data is saved to the memory.

Figure 9A:
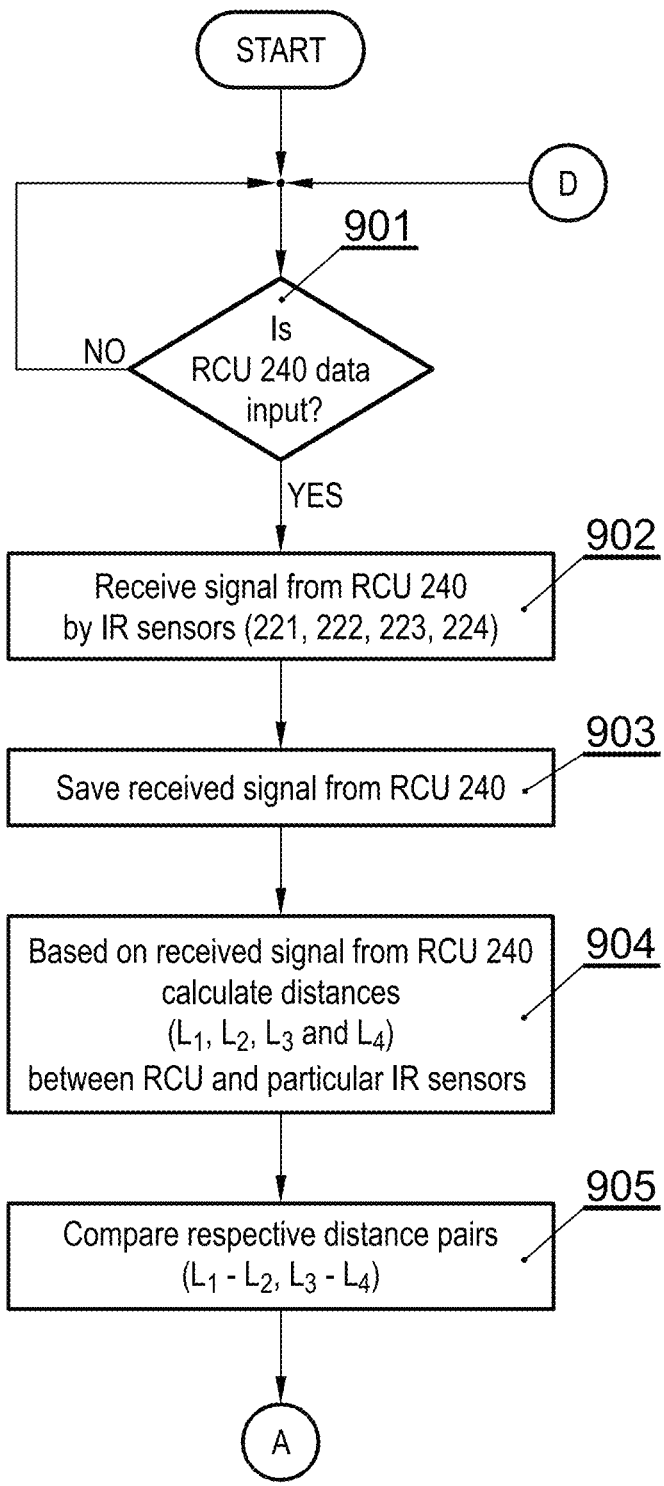
FIGS. 9A-9C present a flowchart of the consecutive steps of an operation of the automatic screen position adjustment device.
Figure 9B:
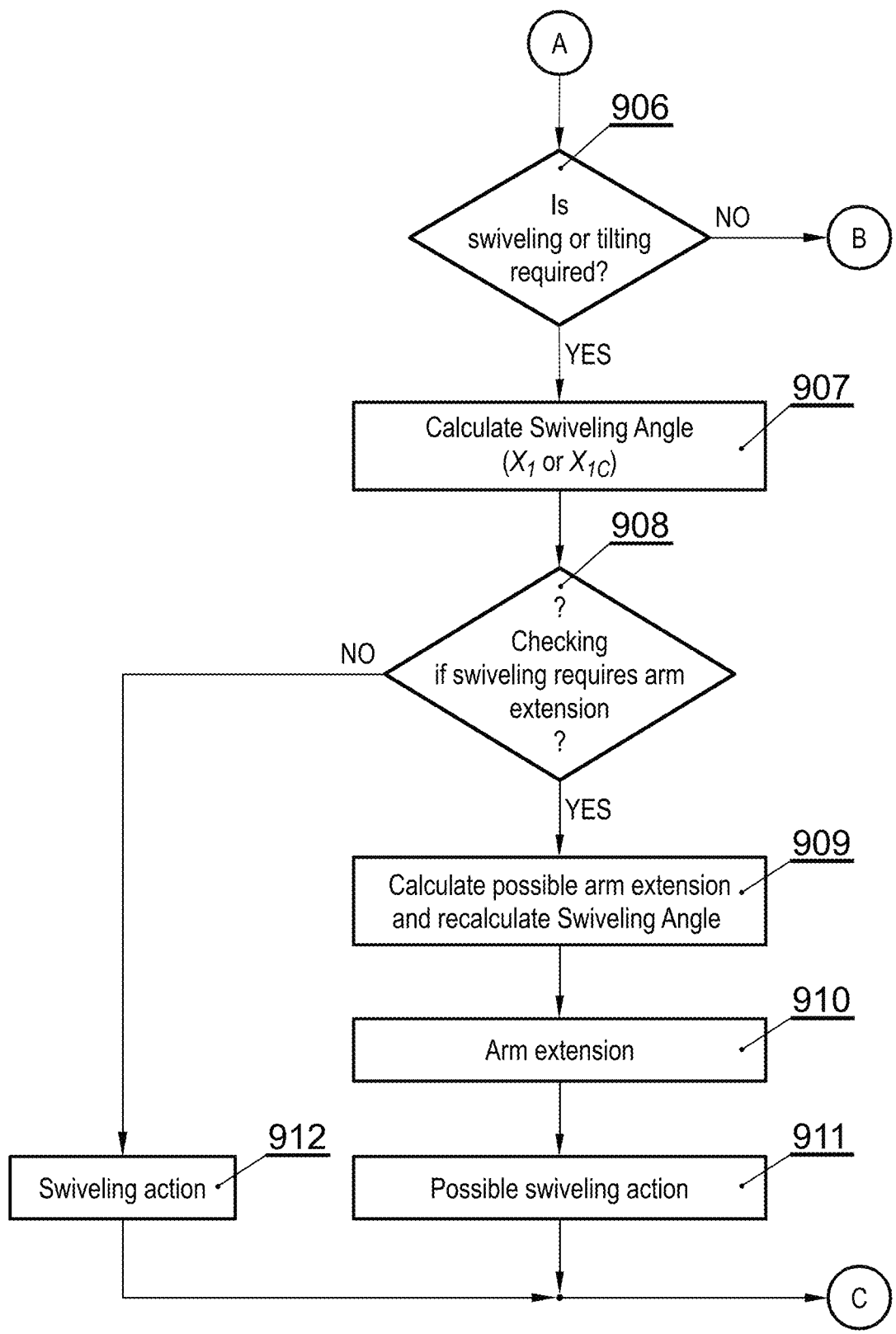
Figure 9C:
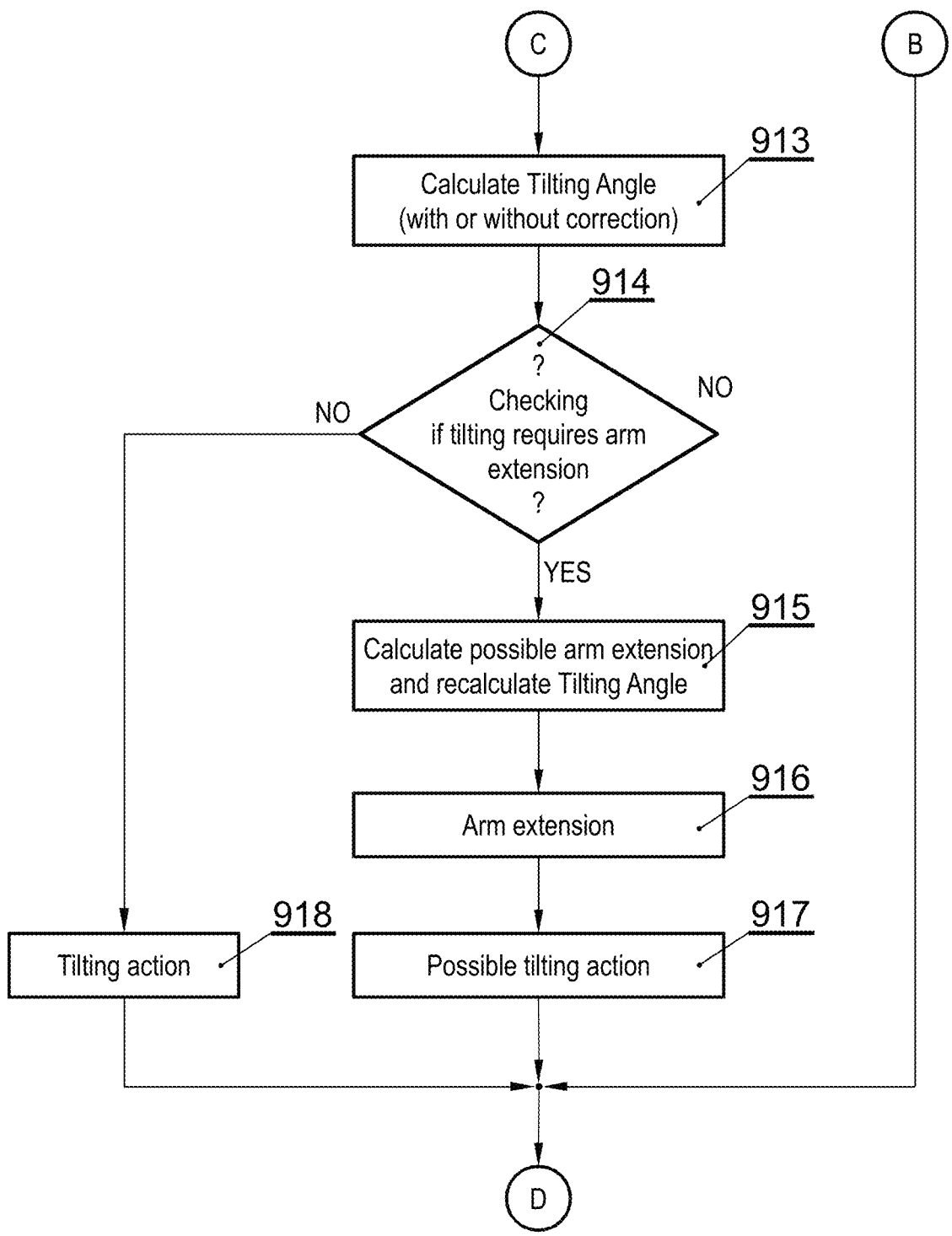

FIGS. 9A-9C present a flowchart of the consecutive steps of an operation of the automatic screen position adjustment device. In the first step 901 a system checks if there is a remote control unit data input signal. If yes, then in step 902 the signal from the remote control unit is received by the IR sensors. In step 903 the received signal is saved. In step 904, basing on the signals received from the remote control unit, distances $L_1$, $L_2$, $L_3$, $L_4$ between the remote control unit and particular IR sensors are calculated. In step 905 the respective distances are compared with each other—$L_1$ with $L_2$ and $L_3$ with $L_4$. Next in step 906 it is checked if swiveling or tilting of the display screen is required. If no, the procedure jumps to the last step, otherwise in step 907 the swiveling angle $X_1$ or $X_{1C}$ is calculated. After calculating the swiveling angle it is checked in step 908 if swiveling requires arm extension. If no, than in step 912 the swiveling action is performed. Otherwise, in step 909, the possible arm extension is calculated and the swiveling angle is recalculated. In step 910 the arm extension is performed and in step 911 the possible swiveling action is performed. In step 913 the tilting angle, with or without the correction resulting from the distance between the axis of rotation of the positioning device and the axis of rotation of the display screen, is calculated. Next in step 915 it is checked if tilting action requires arm extension. If no, then in step 918 the tilting action is performed and the process loops to the first step, otherwise in step 915 the possible arm extension is calculated and the tilting angle is recalculated. In step 916 the arm is extended and in step 917 the possible tilting action is performed after which the procedure loops to the first step.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for adjusting position of a display screen (210) mounted on a motorized support (480), characterized in that it comprises:
    attaching to the display screen (210) a pair of horizontal infrared (IR) sensors (221, 222) aligned along a horizontal axis of the display screen (210), such that the pair of horizontal IR sensors comprises a horizontal left sensor (221) and a horizontal right sensor (222);
    attaching to the display screen (210) a pair of vertical infrared (IR) sensors (231, 232) aligned along a vertical axis of the display screen (210), such that the pair of vertical IR sensors comprises an upper vertical sensor (231) and a lower vertical sensor (232);

measuring the intensity of a signal received from a remote control unit (240) by each of the IR sensors (221, 222, 231, 232);

calculating, based on differences in intensities of the received signal at each IR sensor in a pair of IR sensors and a distance between respective IR sensors in the pair, a distance from each IR sensor to the remote control unit (240);

calculating, based on the distance from each IR sensor to the remote control unit (240), a horizontal angle $\beta_H$ and a vertical angle $\beta_V$ of the display screen (210) relative to the remote control unit (240); and—controlling motor means (750, 760, 770) of the motorized support (480) depending on the angles $\beta_H$ and $\beta_V$ wherein $\beta_H$ is given by:

$$\sin\beta_H = \frac{2 \cdot L_1 \cdot L_2 \cdot \sqrt{1 - \left(\frac{L_1^2 + L_2^2 - D_H^2}{2 \cdot L_1 \cdot L_2}\right)^2}}{D_H \cdot \sqrt{2 \cdot L_1^2 + 2 \cdot L_2^2 - D_H^2}}$$

and $\beta_V$ is given by:

$$\sin\beta_V = \frac{2 \cdot L_3 \cdot L_4 \cdot \sqrt{1 - \left(\frac{L_3^2 + L_4^2 - D_V^2}{2 \cdot L_3 \cdot L_4}\right)^2}}{D_V \cdot \sqrt{2 \cdot L_3^2 + 2 \cdot L_4^2 - D_V^2}}$$

in which: $D_H$ is a distance between the horizontal left sensor (221) and the horizontal right sensor (222); and $L_1$ is a distance between the remote control unit (240) and the horizontal left sensor (221); and $L_2$ is a distance between the remote control unit (240) and the horizontal right sensor (222); and $D_V$ is a distance between the upper vertical sensor (231) and the lower vertical sensor (232); and $L_3$ is a distance between the remote control unit (240) and the upper vertical sensor (231); and $L_4$ is a distance between the remote control unit (240) and the lower vertical sensor (232).

* * * * *